United States Patent [19]

Oshiba

[11] Patent Number: 5,222,058
[45] Date of Patent: Jun. 22, 1993

[54] DATA RECORDING APPARATUS CAPABLE OF RECORDING WITH PREDETERMINED DATA ARRANGEMENT

[75] Inventor: Mitsuo Oshiba, Hachioji, Japan

[73] Assignee: Olympus Optical Co., Ltd., Tokyo, Japan

[21] Appl. No.: 703,412

[22] Filed: May 21, 1991

[30] Foreign Application Priority Data

May 23, 1990 [JP] Japan .................................. 2-131135

[51] Int. Cl.$^5$ .......................... G11B 7/007; G06K 7/10
[52] U.S. Cl. ...................................... 369/59; 235/454; 235/480
[58] Field of Search ...................... 369/59, 32; 360/28, 360/30, 48; 358/330; 235/454, 480, 477, 456

[56] References Cited

U.S. PATENT DOCUMENTS

| | | | |
|---|---|---|---|
| 4,025,957 | 5/1977 | Wada et al. | 360/48 |
| 4,835,628 | 5/1989 | Hinz et al. | 360/48 |
| 4,962,301 | 10/1990 | Rokutan | 369/59 |

FOREIGN PATENT DOCUMENTS

58-500462 3/1983 Japan .
61-187463 8/1988 Japan .

Primary Examiner—Aristotelis Psitos
Assistant Examiner—P. W. Huber
Attorney, Agent, or Firm—Frishauf, Holtz, Goodman & Woodward

[57] ABSTRACT

A data recording apparatus is directed to a modulating-/recording system for modulating data divided into a plurality of blocks and recording the modulated data on a recording medium. A byte sync signal output section outputs byte sync signals to be inserted between the plurality of blocks. A modulating section modulates data of one block while the byte sync signal output section outputs the byte sync signal. A modulated data storage section temporarily stores the data modulated by the modulating section. A modulated data read section reads out modulated data to be recorded from the modulated data storage section after the byte sync signal output section outputs the byte sync signal. The data to be recorded represents a predetermined arrangement regardless of recording directions.

16 Claims, 6 Drawing Sheets

DATA RECORDING APPARATUS CAPABLE OF RECORDING WITH PREDETERMINED DATA ARRANGEMENT

BACKGROUND OF THE INVENTION

1. Field of the Invention

The present invention generally relates to a data recording apparatus and, more particularly, to a data recording apparatus for recording data on tracks of a recording medium, e.g., an optical card, an optical tape, or a magnetic card, with a predetermined data arrangement.

2. Description of the Related Art

Optical cards, optical tapes, magnetic cards, and the like are known as recording media for recording data. Of these media, optical cards and magnetic cards are widely used because they are convenient to carry. Especially, magnetic cards are widely used as credit cards and prepaid cards. With regard to optical cards, a variety of applications in the field of finance and medicine are considered because they have large recording capacities.

For example, a method of recording data on the optical cards is disclosed in Unexamined Japanese Patent Publication (KOHYO) No. 58-500462 (National Publication of Translation Version by PCT). According to this method, data is recorded on tracks by moving an optical card and a recording head relative to each other.

In general, when data is to be recorded on a recording medium, such as an optical card, which is constituted by a plurality of linear tracks, a recording time required to record data in two directions of the relative reciprocating motion of the optical card and the recording head is shorter than that required to record data in only one direction of movement.

Figure 4A:
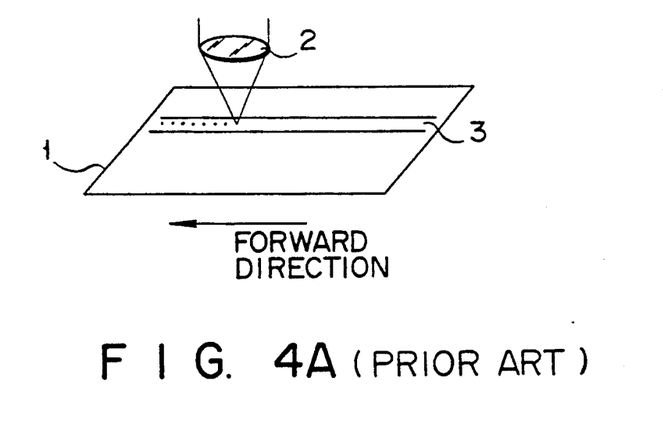
FIGS. 4A and 4B are views showing data recording directions.
Figure 4B:
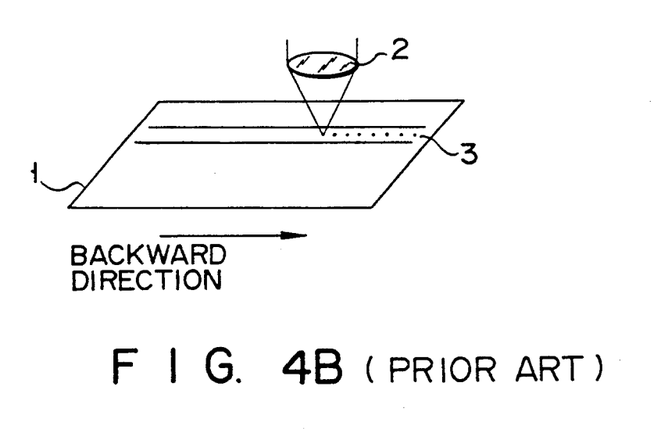

More specifically, according to this recording technique, when, for example, an optical card 1 is to be reciprocated in relation to a recording head 2 to record data as shown in FIGS. 4A and 4B, the data is recorded on tracks 3 on the optical card 1 in two directions, i.e., in a forward motion (forward direction) shown in FIG. 4A and a backward motion (backward direction) shown in FIG. 4B, in accordance with the same modulation rule in the respective directions. In such a recording technique, however, since data is recorded in opposite recording directions, the recording direction of data on a given track cannot be identified. In a reproducing operation, therefore, a data read operation cannot be performed unless some specific means is provided.

Figure 5:
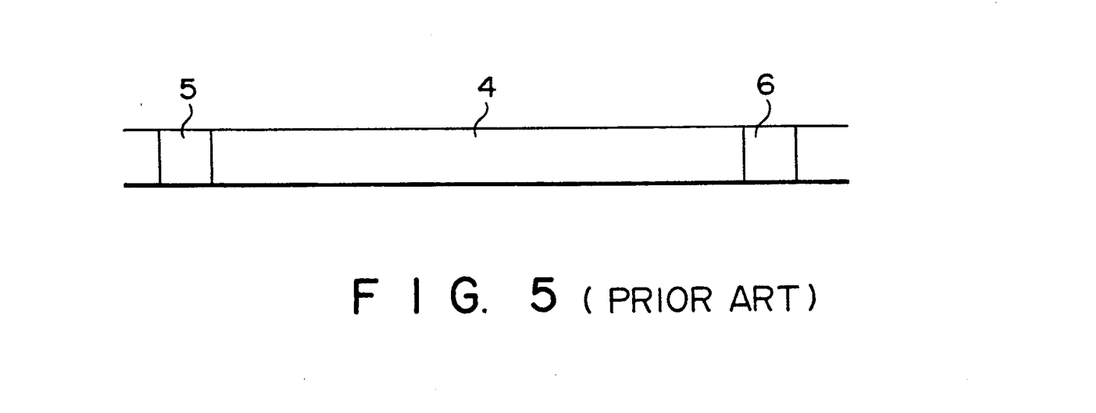
FIGS. 5 and 6 are views respectively showing a conventional data recording method and apparatus.

For this reason, for example, flags 5 and 6 for discriminating recording directions are recorded on the start and end portions of a data block 4, as shown in FIG. 5, so that a data read operation can be performed upon discrimination of recording directions on the basis of these flags. In such a technique, however, since areas for recording the flags 5 and 6 are required, the recording capacity of each track 3 is reduced accordingly. In addition, since this technique requires a circuit for recording the flags 5 and 6 and a circuit for discriminating a flag in a read operation, the apparatus becomes complicated and expensive.

In order to solve this problem, Published Unexamined Japanese Patent Application No. 63-187463 discloses a technique of recording data by switching data arrangements and modulation rules in accordance with the direction of the relative movement of a cardlike recording medium and a recording head. This technique will be described below with reference to FIG. 6.

Figure 6:
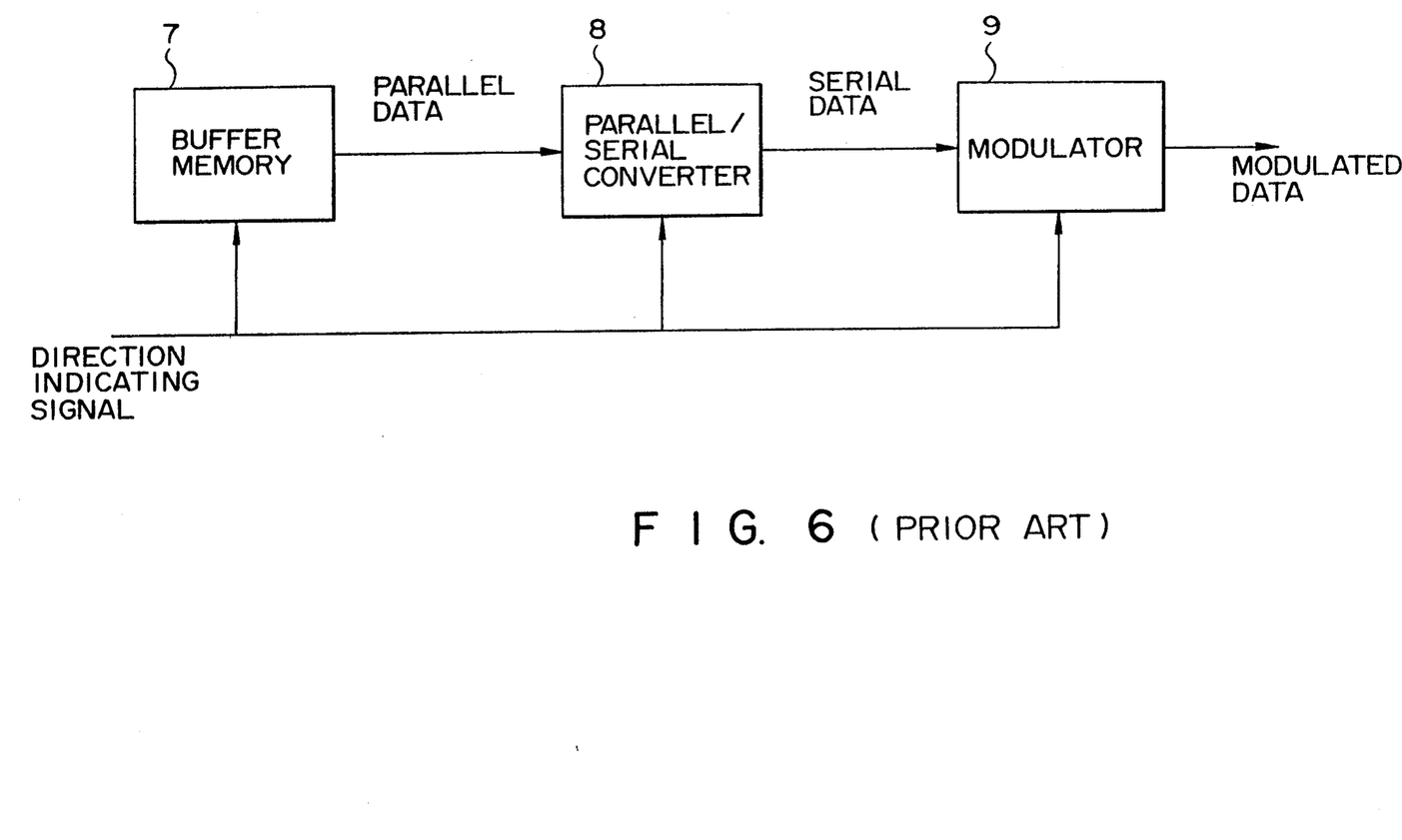

FIG. 6 shows a modulation circuit based on MFM (Modified Frequency Modulation). Referring to FIG. 6, reference numeral 7 denotes a buffer memory for storing data to be recorded; 8, a parallel/serial converter for converting parallel data output from the buffer memory 7 in a predetermined order into serial data; and 9, a modulator for modulating the serial data. In this modulation circuit, the order of reading out data from the buffer memory 7 is switched to another order in accordance with a direction indicating signal. Upon reception of the direction indicating signal, the parallel/serial converter 8 switches conversion directions, i.e., sequentially converts the parallel data from the most significant bit into a serial bit string (forward direction) or sequentially converts the parallel data from the least significant bit into a serial bit string (backward direction). The modulator 9 receives the direction indicating signal and switches conversion rules for the serial data output from the parallel/serial converter 8. The modulated data obtained by the modulator 9 is data modulated by normal MFM in forward recording. In backward recording, the modulated data is identical to the modulated data in forward recording when viewed from the direction opposite to the backward recording direction. According to this technique, therefore, data can be recorded on tracks with a predetermined data arrangement regardless of recording directions.

Although this technique can be applied to fixed word length codes in MFM, it cannot be applied, as it is, to variable word length codes in 2-7 modulation. This is because the bit length of original data to be modulated varies depending on the contents of original data.

In order to solve such a problem, data of one sector may be modulated as a whole, so that when modulated data is to be read out, orders of reading the data are switched in accordance with recording directions. In this technique, however, modulating and recording operations cannot be simultaneously performed, leading to an increase in recording time. In addition, according to this technique, since the storage capacity of a storage means, e.g., a random-access memory (RAM), for temporarily storing modulated data is increased, the cost of the apparatus is increased.

SUMMARY OF THE INVENTION

It is, therefore, an object of the present invention to provide a new and improved data recording apparatus capable of recording with a predetermined data arrangement, which can record data on tracks with a predetermined data arrangement regardless of recording directions, at a low cost and with a short recording time, even if the data are modulated by using variable word length codes as in 2-7 modulation.

In order to achieve the above object, according to the present invention, there is provided a data recording apparatus for modulating data divided into a plurality of blocks and recording the modulated data on a recording medium, comprising byte sync signal output means for outputting byte sync signals to be inserted between the plurality of blocks, modulating means for modulating data of one block while the byte sync signal output means outputs the byte sync signal, and modulated data storage means for temporarily storing the data modulated by the modulating means.

According to the present invention, data of one block is modulated during a period in which a byte sync signal to be inserted between data blocks is output, and the modulated data is temporarily stored. After the byte sync signal output means outputs the byte sync signal, the modulated data to be recorded, which has been stored, is read out to be recorded. With this processing, data is recorded with a predetermined arrangement regardless of recording directions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiment of the invention a illustrated in the accompanying drawings, in which like reference characters designate like or corresponding parts throughout the several drawings.

An embodiment of the present invention will be briefly described first.

In the present invention, modulation of data is performed in units of blocks of data while a byte sync signal is output. Modulated data is temporarily stored in a RAM and is read out at the end of an output operation of a byte sync signal. At this time, the order of reading out the data is changed in accordance with a recording direction, so that the data is recorded on tracks with a predetermined arrangement regardless of recording directions.

A data recording apparatus according to an embodiment of the present invention will be described below with reference to the accompanying drawings.

Figures 1A, 1B:
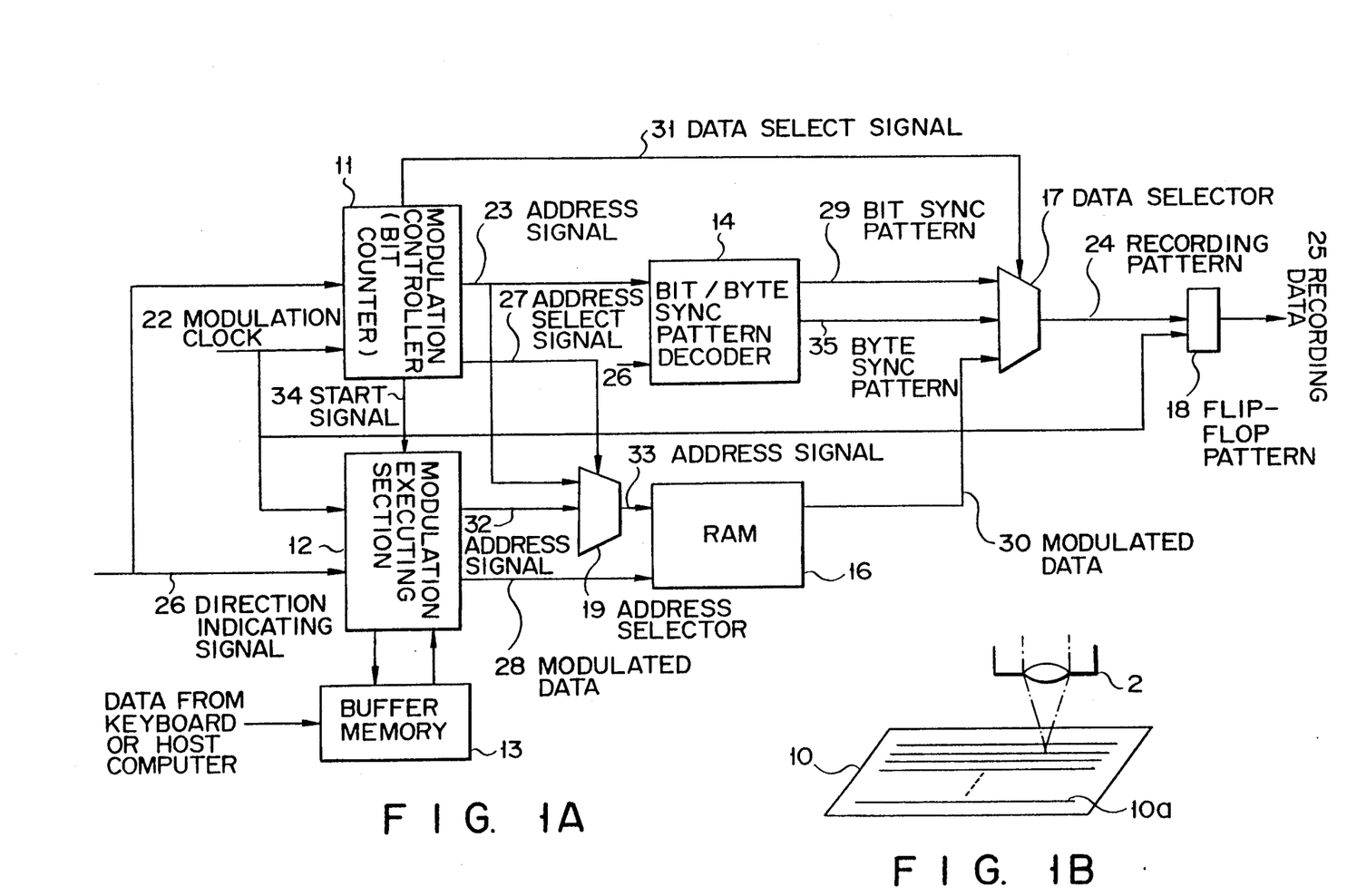
FIG. 1A is a block diagram showing a circuit arrangement of a data recording apparatus according to an embodiment of the present invention.
FIG. 1B is a view showing an optical card and a recording head used in the present invention.

FIG. 1 shows a circuit arrangement of the data recording apparatus according to an embodiment of the present invention, in which data is recorded by reciprocating an optical card with respect to a recording head.

Figure 2A:
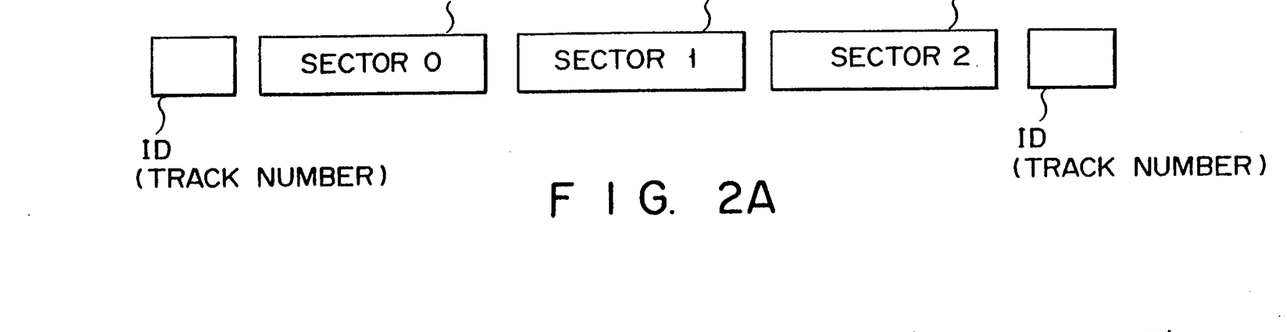
FIGS. 2A and 2B are views, each showing a data format.

As shown in FIG. 1B, a plurality of tracks 10a are formed on an optical card 10 on which data is recorded. Each track 10a is constituted by several sectors S, as shown in FIG. 2A. ID portions $ID_1$ and $ID_2$ in which ID codes for identifying a track number are written are arranged on both ends of each track.

Figure 2B:
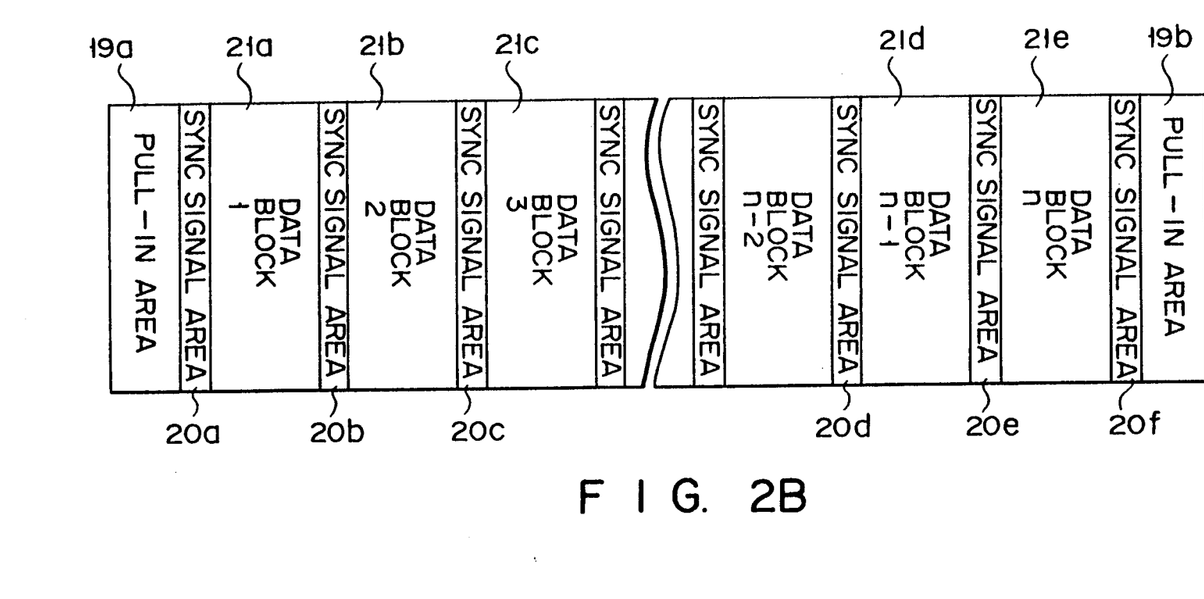

FIG. 2B shows a format of data to be recorded on each sector S of the optical card 10. Referring to FIG. 2B, reference numerals 19a and 19b denote phase-locked loop (PLL) type pull-in areas for establishing bit synchronization; 20a to 20f, sync signal areas for establishing byte synchronization; and 21a to 21e, data blocks 1 to n, each including predetermined data.

The function of each circuit in FIG. 1A will be briefly described below. A modulation executing section 12 includes a circuit for modulating data by the 2-7 modulation scheme. A modulation controller 11 controls an operation of the modulation executing section 12. A buffer memory 13 stores data to be modulated which is input from a keyboard or a higher-rank control (host) computer. In addition, the buffer memory 13 exchanges data (to be stored) with the modulation executing section 12. A bit/byte sync pattern decoder 14 as a byte sync signal output means decodes a bit sync pattern and a byte sync pattern in accordance with address signals from the modulation controller 11. A RAM 16 stores data modulated by the modulation executing section 12. An address selector 19 selects either a read address signal 23 from the modulation controller 11 or a write address signal 32 from the modulation executing section 12. A data selector 17 selects either an output from the bit/byte sync pattern decoder 14 or an output from the RAM 16. A flip-flop circuit 18 latches an output from the data selector 17 in response to a modulation clock 22. Thereafter, an output from the flip-flop circuit 18 is supplied, as recording data, to the recording head 2 shown in FIG. 1B so as to be optically recorded on the tracks 10a of the optical card 10.

Figure 3A:
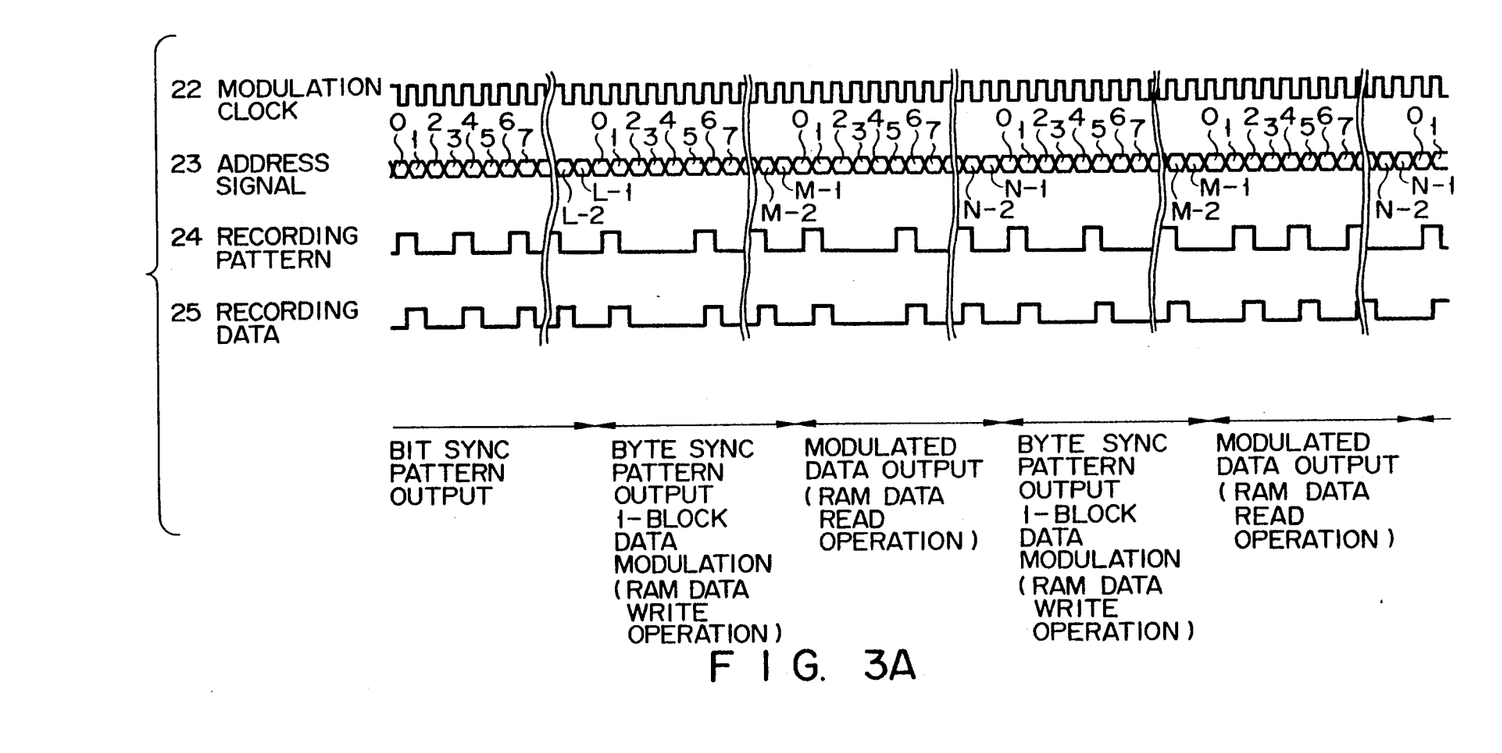
FIGS. 3A and 3B are timing charts showing a recording data output sequence.
Figure 3B:
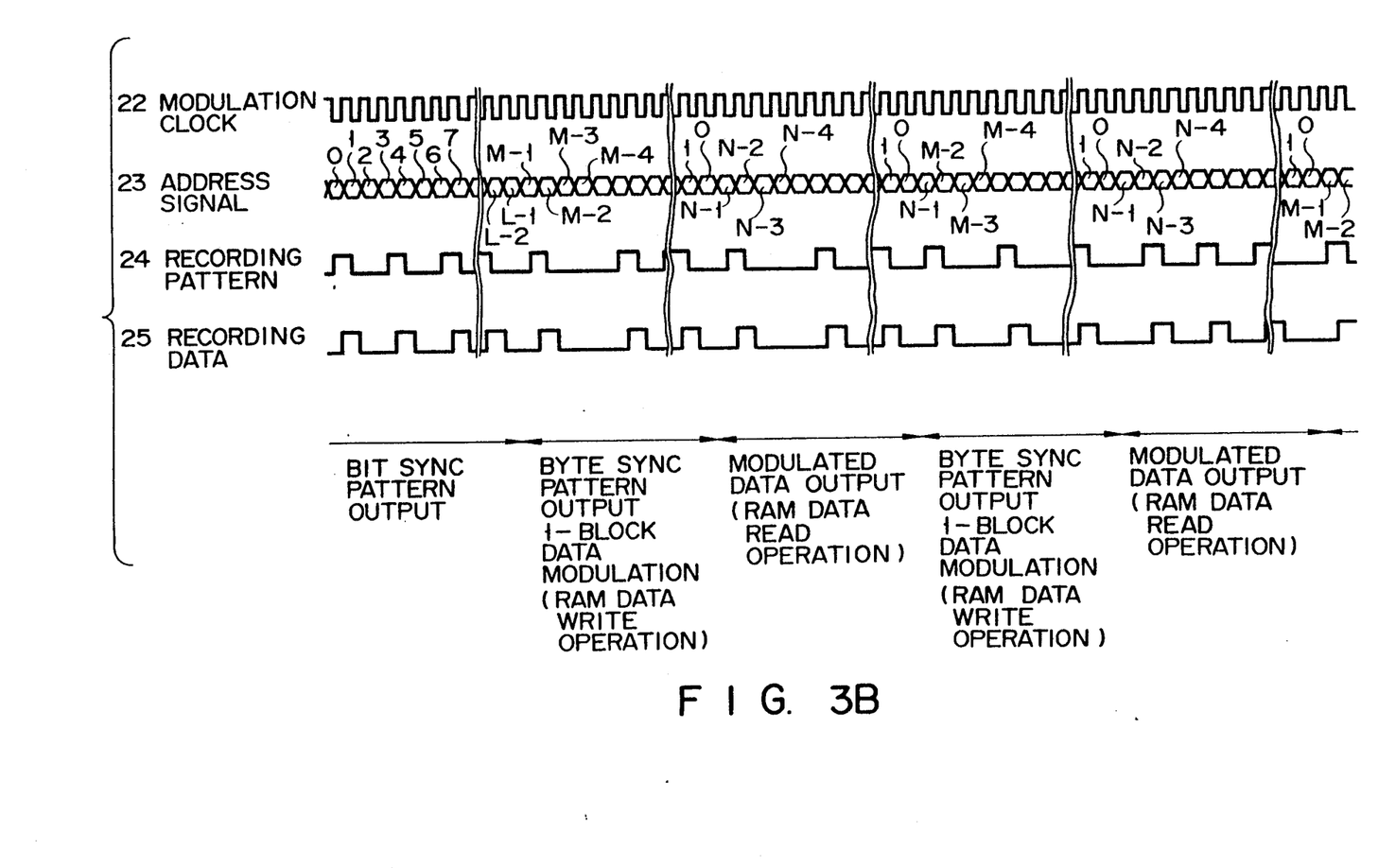

An operation of the present invention will be described below with reference to FIGS. 1A and 1B to FIGS. 3A and 3B. FIG. 3A is a timing chart of forward recording. FIG. 3B is a timing chart of backward recording.

An operation of each circuit in forward recording of data corresponding to one sector will be described below.

An operation associated with recording of a bit sync pattern on the PLL pull-in area shown in FIG. 2B will be described first.

Referring to FIG. 1A, the modulation controller 11 starts an internal bit counter to count modulation clocks 22, and outputs 0th to (L−1)th address signals 23 to the bit/byte sync signal pattern decoder 14. In this case, L is the number of bits of the PLL pull-in area 19a. In response to the address signals 23, the bit/byte sync pattern decoder 14 outputs a bit sync pattern 29 to be recorded on the PLL pull-in area 19a. This pattern is normally a pattern (100100100 . . . ) having the minimum pit pitch of 2-7 codes.

At this time, the modulation controller 11 controls the data selector 17 by using a data select signal 31 to select the bit sync pattern 29. The data selector 17 outputs this pattern as a recording pattern 24. The recording pattern 24 becomes recording data 25 sampled by the modulation clock 22 in the flip-flop circuit 18.

An operation associated with recording of a byte sync pattern on the sync signal area 20a shown in FIG. 2B will be described below.

The modulation controller 11 controls an internal bit counter which is accommodated therein so as to clear it when it counts up to (L−1). In addition, the modulation controller 11 outputs 0th to (M−1)th address signals 23 to the bit/byte sync pattern decoder 14 in response to a forward direction indicating signal 26. In this case, M is the number of bits of the sync signal area 20a. At the same time, the modulation controller 11 outputs a one-block modulation start signal 34 to the modulation executing section 12 to instruct modulation start of one-block data.

In response to the address signal 23 and the direction indicating signal 26, the bit/byte sync pattern decoder 14 outputs a byte sync pattern 35 to be recorded on the sync signal area 20a. At this time, the modulation controller 11 controls the data selector 17 by using a data select signal to select the byte sync pattern 35. The data selector 17 outputs this signal as a recording pattern 24. The recording pattern 24 is sampled as recording data 25 by the modulation clock 22 in the flip-flop circuit 18.

Note that the above-mentioned byte sync pattern is based on a modulation rule and does not appear in data.

An operation associated with recording of data on the data block 21a shown in FIG. 2B will be described below.

The modulation executing section 12 is operated independently of the bit/byte sync pattern decoder 14. While the bit/byte sync pattern decoder 14 outputs the byte sync pattern 35 as the recording data 25, the modulation executing section 12 executes modulation of one-block data. In this case, since the direction indicating signal 26 indicates a forward direction, the modulation executing section 12 sequentially supplies address signals to the buffer memory 13, starting from an address signal for an address at which data corresponding to the start portion of the data block 21a shown in FIG. 2B is stored, thereby reading out data from the buffer memory 13 and executing modulation. Upon completion of modulation, the modulation executing section 12 outputs modulated data 28 to the RAM 16 and also outputs the address signal 32 to the address selector 19 to write the modulated data in the RAM 16. At this time, the modulation controller 11 controls an address select signal 27 to select the address signal 32. The address signal 32 is then supplied, as an address signal 33, to the RAM 16. In this manner, modulation of one-block data is completed before an output operation of the byte sync pattern 35 comes to an end.

The modulation controller 11 controls the internal bit counter to clear it when it counts up to (M−1), and outputs 0th to (N−1)-th address signals 23 to the address selector 19 to write data in the data block 21a shown in FIG. 2B. In this case, N is determined by (the total number of bits of one-block data+4)×2. In this relation, 4 is added to perform modulation upon addition of a pattern (0010) representing a delimiter so as to set a constant data length after modulation. In addition, 2 is multiplied because the number of bits is doubled upon modulation in the 2-7 modulation scheme.

When the modulated data is to be written, the modulation controller 11 controls the address select signal 27 to select the address signal 23. Therefore, the address signal 33 is input to the RAM 16. Since the one-block modulated data has been written in the RAM 16, modulated data 30 corresponding to the address signal 33 is read out. In this case, since the modulation controller 11 controls the data select signal 31 to cause the data selector 17 to select the modulated data 30, the modulated data 30 is output to the flip-flop circuit 18. In the flip-flop circuit 18, the modulated data 30 is sampled as the recording data 25 by modulation clocks.

A basic circuit operation of the data recording apparatus shown in FIG. 1A has been described above.

Subsequently, in the same manner, the above-described byte sync pattern output sequence and modulated data output sequence are repeated a number of times corresponding to the number of blocks included in one sector, as shown in FIG. 3A. In addition, a byte sync pattern output sequence is executed with respect to the sync signal area 20f shown in FIG. 2B. In this case, a modulating operation corresponding to one block is not performed.

Finally, a recording operation is performed with respect to the PLL pull-in area 19b in FIG. 2B. This operation will be described below.

The modulation controller 11 starts the internal bit counter to count the modulation clocks 22, and outputs the (L−1)th to 0th address signals 23 to the bit/byte sync pattern decoder 14. In this case, L is the number of bits of the PLL pull-in area. In response to the address signals 23, the bit/byte sync pattern decoder 14 outputs the bit sync pattern 29 to be recorded on the PLL pull-in area 19b. At this time, the modulation controller 11 controls the data select signal 31 to cause the data selector 17 to select the bit sync pattern 29. The data selector 17 outputs this pattern as the recording pattern 24. This recording pattern 24 is sampled as the recording data 25 by the modulation clock 22 in the flip-flop circuit 18. The recording data 25 obtained in this manner is bilaterally symmetrical with respect to the bit pattern in the area 19a. The above description is associated with forward recording.

An operation of each circuit in backward recording will be described below.

In backward recording, recording of the first bit pattern is performed in the same manner as in forward recording. In this case, however, the first bit pattern is recorded on the PLL pull-in area 19b shown in FIG. 2B.

An operation associated with recording of a byte sync pattern on the sync signal area 20f in FIG. 2B will be described below.

The modulation controller 11 performs control to initialize the internal bit counter when it counts up to (L−1). Since the direction indicating signal 26 indicates the backward direction, the modulation controller 11 outputs the (M−1)th to 0th address signals 23 to the bit/byte sync pattern decoder 14. At the same time, the modulation controller 11 outputs the one-block modulation start signal 34 to the modulation executing section 12 to cause it to start one-block modulation. In addition, the bit/byte sync pattern decoder 14 outputs the byte sync pattern 35 to be recorded on the sync signal area 20f in response to the address signals 23. At this time, since the address signals 23 are output in the order opposite to that in forward recording, the byte sync pattern 35 becomes a reverse pattern to that in forward recording. The modulation controller 11 then controls the data select signal 31 to cause the data selector 17 to select the byte sync pattern 35. The data selector 17 outputs this pattern as the recording pattern 24. The recording pattern 24 is sampled as the recording data 25 by the modulation clock 2 in the flip-flop circuit 18.

An operation associated with recording of data on the data block 21e in FIG. 2B will be described below.

The modulation executing section 12 is operated independently of the bit/byte sync pattern decoder 14. While the bit/byte sync pattern decoder 14 outputs the byte sync pattern 35 as the recording data 25, the modulation executing section 12 executes modulation of one-block data. At this time, since the direction indicating signal 26 indicates the backward direction, the modulation executing section 12 sequentially supplies address signals to the buffer memory 13, starting from an address signal for an address at which data corresponding to the start portion of the data block 21e shown in FIG. 2B is stored, thereby reading out data from the buffer memory 13 and executing modulation. The modulation executing section 12 outputs the modulated data 28 to the RAM 16 and also outputs the address signal 32 to the address selector 19. At this time, the modulation controller 11 controls the address select signal 27 to select the address signal 32. The address signal 32 is then supplied, as an address signal 33, to the RAM 16. In this manner, modulation of one-block data is completed before an output operation of the byte sync pattern 35 comes to an end.

The modulation controller 11 controls the internal bit counter to initialize it when it counts up to 0. Since the direction indicating signal 26 indicates the backward direction, the modulation controller 11 outputs the (N−1)th to 0th address signals 23 to the address selector 19. Since the modulation controller 11 controls the address select signal 27 to select the address signal 23, the address signal 33 is input to the RAM 16. Since modulated data of one block has been written in the RAM 16, the modulated data 30 corresponding to the address signal 33 is read out. In this case, however, the modulated data is read out in the reverse order. At this time, the modulation controller 11 controls the data select signal 31 to cause the data selector 17 to select the modulated data 30, and the modulated data 30 is output to the flip-flop circuit 18. In addition, the modulated data is sampled as the recording data 25 by the modulation clock 22 in the flip-flop circuit 18.

Subsequently, in the same manner, the above-described byte sync pattern output sequence and modulated data output sequence are repeated a number of times corresponding to the number of blocks included in one sector, as shown in FIG. 3B.

Furthermore, a byte sync pattern output sequence is executed again with respect to the sync signal area 20a in FIG. 2B. In this case, however, a modulating operation corresponding to one block is not performed.

Finally, the recording data is output with respect to the PLL pull-in area 19a shown in FIG. 2B. This operation is performed in the same manner as in forward recording. The above description is associated with backward recording.

The modulated data obtained in the above-described manner becomes normal 2-7 code data in forward recording. In backward recording, the modulated data is identical to the modulated data in forward recording when viewed from the direction opposite to the backward recording direction.

In this embodiment, a RAM is used as a means for temporarily storing modulated data of one block. However, a register constituted by a flip-flop circuit may be used. In the above-described embodiment, a 2-7 code scheme is exemplified. However, the present invention can be applied to other modulation schemes. In addition to an optical card, the present invention can be applied to other recording media such as a magnetic card and optical tape.

As has been described above, according to the present invention, modulation of data is performed in units of blocks while a byte sync signal is output, and the modulated data is temporarily stored in a modulated data storage means. When the output operation of the byte sync signal is completed, the modulated data is read out from the modulated data storage means, and the order of reading the data is changed in accordance with recording directions. In modulation, therefore, the content of original data has a predetermined arrangement regardless of recording directions, thereby providing a data recording apparatus which can record data on tracks with a predetermined data arrangement regardless of recording directions, at a low cost and with a short recording time, even if the data are modulated by using variable word length codes as in 2-7 modulation.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A data recording apparatus for modulating data divided into a plurality of blocks and recording the modulated data on recording tracks of a recording medium, said data recording apparatus having a forward recording mode wherein the modulated data is recorded on the recording tracks in a forward direction and a backward recording mode wherein the modulated data is recorded on the recording tracks in a backward direction, said data recording apparatus comprising:

byte sync signal output means for outputting a byte sync signal to be inserted between adjacent blocks of said plurality of blocks;

modulating means for modulating, block by block, data included in the data divided into the plurality of blocks, while said byte sync signal output means outputs the byte sync signal, to produce the modulated data, said modulating means including:

modulation control means for controlling timing of execution of modulation of the data of one block in response to a modulation clock signal and a data recording direction indicating signal which indicates one of the forward mode and the backward mode to be set, and modulating executing means for executing modulation of received data of one block in response to the modulation clock signal and the data recording direction indicating signal to produce the modulated data;

modulated data storage means for temporarily storing modulated data output from said modulating means;

said modulation control means outputting a first address signal indicative of a position where data is to be temporarily stored in said modulated data storage means on the basis of the data recording direction indicating signal, said modulating executing means outputting a second address signal indicative of a position where data is temporarily stored in said modulated data storage means on the basis of the data recording direction indicating signal, said modulation control means further outputting an address select signal which selects one of the first and second address signals when data is to be recorded and a data select signal which selects the modulated data from the modulated data storage means when data is to be recorded; and reading out means for reading out the modulated data of one block from said modulated data storage means as data to be recorded after said byte sync signal output means outputs the byte sync signal, such that a read-out order in which the modulated data is read out by said reading out means in the backward recording mode is opposite to a read-out order in which the modulated data is read out in the forward recording mode.

2. An apparatus according to claim 1, wherein said modulation control means includes bit counter means for counting pulses of the modulation clock signal.

3. An apparatus according to claim 1, wherein said byte sync signal output means includes decoder means for receiving the first address signal and the data recording direction indicating signal from said modulation control means and for outputting said byte sync signal in response thereto.

4. An apparatus according to claim 1, wherein said modulated data storage means includes:

address selector means for selecting one of the first address signal from said modulation control means and the second address signal from said modulation executing means in accordance with the address select signal from said modulation control means so as to output a third address signal, and memory means for receiving the modulated data from said modulation executing means and the third address signal from said address selector means and for outputting the modulated data.

5. An apparatus according to claim 4, wherein said reading out means includes data selector means for selecting the byte sync signal from said byte sync signal output means in accordance with the data select signal from said modulation control means, and for outputting, as a recording pattern, the modulated data stored in said memory means.

6. An apparatus according to claim 5, wherein said reading out means further includes means for outputting recording data by latching the recording pattern from said data selector means by using the modulation clock signal.

7. An apparatus according to claim 6, wherein the modulated data includes 2-7 codes.

8. A data recording apparatus for modulating data divided into a plurality of blocks and recording the modulated data on recording tracks of a recording medium, said data recording apparatus having a forward recording mode wherein the modulated data is recorded on the recording tracks in a forward direction and a backward recording mode wherein the modulated data is recorded on the recording tracks in a backward direction, said data recording apparatus comprising:

byte sync signal output means for outputting a byte sync signal to be inserted between adjacent blocks of said plurality of blocks;

modulation means for modulating, block by block, data included in the data divided into the plurality of blocks, while said byte sync signal output means outputs the byte sync signal, to produce the modulated data;

modulated data storage means for temporarily storing modulated data output from said modulating means; and reading out means for reading out the modulated data of one block from said modulated data storage means as data to be recorded after said byte sync signal output means outputs the byte sync signal such that a read-out order in which the modulated data is read out by said reading out means in the backward recording mode is opposite to a read-out order in which the modulated data is read out in the forward recording mode.

9. An apparatus according to claim 8, wherein said modulation means includes:

modulation control means for outputting a timing signal which indicates a timing of executing modulation of the data of one block; and modulating executing means for executing the modulation of the data of one block upon receipt of the timing signal;

the modulation control means outputting a first address signal indicative of a position where data is to be temporarily stored in said modulated data storage means on the basis of a data recording direction indicating signal which indicates one of the forward mode and the backward mode to be set; and the modulating executing means outputting a second address signal indicative of a position where data is temporarily stored in said modulated data storage means on the basis of the data recording direction indicating signal.

10. An apparatus according to claim 9, wherein said modulation control means includes bit counter means for counting a modulation clock signal serving as the timing signal which indicates a timing of executing modulation of the data of one block.

11. An apparatus according to claim 9, wherein said modulation control means outputs a third address signal in response to said data recording direction indicating signal, and said byte sync signal output means includes decoder means for outputting the byte sync signal based on a value of the third address signal.

12. An apparatus according to claim 11, wherein said modulation control means terminates a modulating operation of the data of one block before an output operation of the byte sync signal output means is completed, and control the storage of the modulated data of one block in said modulated data storage means on the basis of the second address signal.

13. An apparatus according to claim 12, wherein said second address signal is a signal indicating the number N of addresses, where N is determined by ((total number of bits of one block of data+4)×2).

14. An apparatus according to claim 12, wherein said reading out means reads out the modulated data of one block from said modulated data storage means on the basis of the first address signal.

15. An apparatus according to claim 11, wherein said reading out means includes data selector means for alternatively outputting the modulated data read out from said modulated data storage means and the byte sync signal output from said byte synch signal output means.

16. An apparatus according to claim 15, wherein said reading out means further includes means for outputting recording data by latching a recording pattern from said data selector means by using a modulation clock signal.

* * * * *